US011858095B2

(12) United States Patent
Falk

(10) Patent No.: US 11,858,095 B2
(45) Date of Patent: Jan. 2, 2024

(54) UNIVERSAL SKATEBOARD AND SURFBOARD TOOL

(71) Applicant: Gregory Falk, Venice, CA (US)

(72) Inventor: Gregory Falk, Venice, CA (US)

( * ) Notice: Subject to any disclaimer, the term of this patent is extended or adjusted under 35 U.S.C. 154(b) by 91 days.

(21) Appl. No.: 17/515,409

(22) Filed: Oct. 30, 2021

(65) Prior Publication Data

US 2023/0140488 A1 May 4, 2023

(51) Int. Cl.
*B25B 23/00* (2006.01)
*B25B 13/06* (2006.01)
*A24F 3/00* (2006.01)
*B25B 15/00* (2006.01)

(52) U.S. Cl.
CPC ............ *B25B 23/0007* (2013.01); *A24F 3/00* (2013.01); *B25B 13/065* (2013.01); *B25B 15/005* (2013.01); *B25B 15/008* (2013.01)

(58) Field of Classification Search
CPC . B25B 23/0007; B25B 13/065; B25B 15/005; B25B 15/008; B25B 13/06; B25B 13/48; B25B 13/56; A24F 3/00; B25F 1/00
USPC ......... 81/437, 124.4, 125.1, 436; 7/151, 138
See application file for complete search history.

(56) References Cited

U.S. PATENT DOCUMENTS 3,678,789 A * 7/1972 Wilson .................... B25B 13/48 81/64
4,504,993 A 3/1985 Gamble
4,774,736 A * 10/1988 Brawner ................. B25B 23/16 81/437
5,778,896 A 7/1998 Seals et al.
6,279,434 B1 8/2001 Brown
6,295,897 B1 10/2001 Swank et al.
6,502,483 B1 * 1/2003 Swank .................... B25B 13/56 81/177.4
D622,561 S 8/2010 Brown, III
8,359,954 B2 1/2013 Johnson et al.
10,040,185 B2 8/2018 Davis
2003/0217623 A1 11/2003 Brown
(Continued)

FOREIGN PATENT DOCUMENTS

GB 2194476 A * 3/1988 ............. B25B 13/06

*Primary Examiner* — Don M Anderson
*Assistant Examiner* — Jason Khalil Hawkins
(74) *Attorney, Agent, or Firm* — LOZA & LOZA, LLP; Heidi L. Eisenhut

(57) ABSTRACT

A compact, lightweight, universal multi-functional tool that can be used on the fly to adjust and repair surfboards and skateboards is disclosed. The tool includes a housing and an adjustment member. The housing comprises an elongated cylindrical member having a first elongated cylindrical member end and an opposing second elongated cylindrical member end; a first socket head integrally connected to the first elongated cylindrical member end, the first socket head defining a first hexagonal socket; a second socket head integrally connected to the second elongated cylindrical member end, the second socket head defining a second first hexagonal socket; and a cavity extending horizontally through the first socket head, the elongated cylindrical member, and the second socket head. The adjustment member, configured to be received within the cavity, the adjustment member comprises a first arm; and a second arm, the second arm integrally connected, and perpendicular to, the first arm.

19 Claims, 11 Drawing Sheets

(56) References Cited

U.S. PATENT DOCUMENTS

| | | | | |
|---|---|---|---|---|
| 2018/0104807 | A1* | 4/2018 | Ma | B25B 27/0035 |
| 2019/0299389 | A1* | 10/2019 | Tsai | B25B 23/0007 |

* cited by examiner

UNIVERSAL SKATEBOARD AND SURFBOARD TOOL

TECHNICAL FIELD

The present invention relates generally to a universal multifunctional hand tool for use in adjusting, repairing and/or replacing hardware on skateboards and surfboards. The multifunctional hand tool is a universal tool that can be utilized on different sized screws, bolts, and sockets on skateboards and surfboards so that only single tool is needed.

BACKGROUND

To become proficient in any sport requires many hours of practice over many years. Some sports lend themselves more easily to practice and train while other sports require specific areas or venues to practice.

One of the most difficult and complex sports in the world is surfing. Learning to surf can be very challenging as it not only takes a lot of time to develop the necessary skills but also requires a body of water, such as an ocean. Further complicating matters is that the conditions of the body of water are never the same and constantly changing, affecting the waves differently every day making training and practicing very difficult. These conditions can include wind, tides, and swells.

Another difficult and complex sport which requires many hours of practice over many years to master is skateboarding. However, unlike surfing, there are many places that an individual can practice, such as a skatepark, an actual park, an empty parking lot, a sidewalk, carpet, or grass to name just a few. As such, skateboarding has the benefit of easy access to repetition unlike surfing where the individual is at the mercy of the wave.

Surfing and skateboarding utilize much of the same equipment and techniques. Both sports use boards, decks, or planks to cruise along at increased speed. When comparing original surfboards to those of skateboards, the only difference is in the size of the board and the addition of either wheels or a fin. The shape of the board in both sports relates to how the board is handled. Longboards, both in skating and surfing, use slow, smooth weaving movements to glide down a hill or wave while secondboards are used for tricks, getting air, and moving with quick, whipping actions. As for techniques, both surfing and skateboarding are very similar in the type of balance that is required, and both utilize the same stance by placing feet side by side at a 90-degree angle to the front of the board with the shoulders and head facing forward.

As skateboarding shares much of the same equipment and techniques of surfing, skateboarding is the perfect cross training sport for surfers. As the terrain for skateboarding is fixed, skateboarding offers a bridge or solution to the problems of training and practicing surfing skills discussed above, as surfers can practice their skills repeatedly irrespective of the ever-changing surf conditions. If a surfer cannot get into the water frequently, riding a skateboard is the perfect way for an individual to practice similar tricks to surfing over and over again.

Practicing on a skateboard allows surfers to experiment with new carves, visualize new lines, and mimic some movements similar to surfing. Using a skateboard, surfers can practice their skills whenever and as often as they like as the skateboarders are not dependent on the conditions of the water. Additionally, skateboarding uses very similar lower body muscle groups to those of surfing allowing surfers to strengthen and build endurance in these muscles which greatly improves a surfer's surf fitness.

Both surfboards and skateboards frequently require adjustments and repairs. With skateboards, there are a variety of wheels, boards, and trucks that are available. Not only are there a number of truck manufacturers, but there are also numerous different types and designs of trucks that are used for different skateboarding conditions. For example, there may be a truck type that is particularly adapted to a certain riding mode (e.g., stairs, railings, bowls, spines, or pipes) that is unsuitable for other courses or riding modes. This may be a result of the tightness or softness of the truck pivoting assembly, the size of the truck, and the type of wheels. Trucks also generally have a tightness adjustment so that the same truck can be tightened up to require more turning force. Thus, the same trucks can be used to cover a range of skateboarding conditions.

However, even though trucks are generally adjustable, a competition rider may have several truck sets that he/she will switch on and off of the board during the course of the various events in a typical skateboarding competition. Additionally, the rider typically needs to periodically adjust the tension on the truck and tighten any nuts or bolts that may loosen during use. Also, in order to keep their boards in good working order, skateboarders must periodically replace worn out parts, such as wheels and wheel bearings, so that their skateboards may continue to function properly.

Surfers also need to make adjustments and repairs to surfboards. For example, the fins on the surfboard may need to be changed or the leash, which is attached to a plug on the surfboard on end and attached to the ankle of the surfer on the other end, may need to be adjusted. Each one of these requires a separate Allen® key.

In view of the above, there is a need for a combination, multi-functional tool that is compact and lightweight so that it may be conveniently carried and utilized as needed on the fly for both surfboards and skateboards.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one aspect, a universal multi-functional skateboard and surfboard tool is provided. The multi-functional skateboard and surfboard tool includes a housing and an adjustment member. The housing comprises an elongated cylindrical member having a first elongated cylindrical member end and an opposing second elongated cylindrical member end; a first socket head integrally connected to the first elongated cylindrical member end, the first socket head defining a first hexagonal socket; a second socket head integrally connected to the second elongated cylindrical member end, the second socket head defining a second first hexagonal socket; and a cavity extending horizontally through the first socket head, the elongated cylindrical member, and the second socket head. The adjustment member, configured to be received within the cavity, the adjustment member comprises a first arm; and a second arm, the second arm integrally connected, and perpendicular to, the first arm.

According to one feature, the first arm terminates in a Phillips® head and the second arm terminates in an Allen® key.

According to another feature, the housing further comprises a magnet on an outer surface of the second socket head.

According to yet another feature, the housing further comprises a socket hole located in a base of the second hexagonal socket for allowing air to enter the cavity.

According to yet another feature, the socket hole is offset from the center of the base of the second hexagonal socket.

According to yet another feature, the base of the second hexagonal socket is tapered creating a funnel inside the second hexagonal socket.

According to yet another feature, the diameter of the first hexagonal socket is smaller than the diameter of the second hexagonal socket.

According to yet another feature, the housing further comprises a third hexagonal socket, the third hexagonal socket is located in the same vertical plane as the second hexagonal socket where the second horizontal socket is located at a first vertical end of the vertical plane and the third horizontal socket is located at an opposing second vertical end of the vertical plane.

According to yet another feature, the diameter of the first second hexagonal socket is smaller than the diameter of the third hexagonal socket.

In one aspect, a universal multifunctional skateboard and surfboard tool is provided. The tool comprises as housing and an adjustment member. The housing comprises an elongated cylindrical member having a first elongated cylindrical member end and an opposing second elongated cylindrical member end; a first socket head integrally connected to the first elongated cylindrical member end, the first socket head defining a first hexagonal socket; a second socket head integrally connected to the second elongated cylindrical member end, the second socket head defining a second first hexagonal socket; a cavity extending horizontally through the first socket head, the elongated cylindrical member, and the second socket head; a socket hole located in a base of the second hexagonal socket for allowing air to enter the cavity; and a magnet on an outer surface of the second socket head. The adjustment member comprises a first arm; and a second arm, the second arm integrally connected, and perpendicular to, the first arm.

According to one feature, the first arm terminates in a Phillips® head and the second arm terminates in an Allen® key.

According to another feature, the socket hole is offset from the center of the base of the second hexagonal socket.

According to yet another feature, the base of the second hexagonal socket is tapered creating a funnel inside the second hexagonal socket.

According to yet another feature, the diameter of the first hexagonal socket is smaller than the diameter of the second hexagonal socket.

According to yet another feature, the housing further comprises a third hexagonal socket, the third hexagonal socket is located in the second socket hole and that same vertical plane as the second hexagonal socket where the second horizontal socket is located at a first vertical end of the vertical plane and the third horizontal socket is located at an opposing second vertical end of the vertical plane.

According to yet another feature, the diameter of the first second hexagonal socket is smaller than the diameter of the third hexagonal socket.

In one aspect, a universal multifunctional skateboard and surfboard tool is provided. The universal multifunctional skateboard and surfboard tool consists of a housing and an adjustment member. The housing consists of an elongated cylindrical member having a first elongated cylindrical member end and an opposing second elongated cylindrical member end; a first socket head integrally connected to the first elongated cylindrical member end, the first socket head defining a first hexagonal socket; a second socket head integrally connected to the second elongated cylindrical member end, the second socket head defining a second first hexagonal socket; a cavity extending horizontally through the first socket head, the elongated cylindrical member, and the second socket head; a socket hole located in a base of the second hexagonal socket for allowing air to enter the cavity; a magnet located on an outer surface of the second socket head; and a third hexagonal socket, the third hexagonal socket is located in the second socket hole and that same vertical plane as the second hexagonal socket where the second horizontal socket is located at a first vertical end of the vertical plane and the third horizontal socket is located at an opposing second vertical end of the vertical plane. The adjustment member consists of a first arm terminating in a Phillips® head; and a second arm terminating in an Allen® key, the second arm integrally connected, and perpendicular to, the first arm.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

The following detailed description is of the best currently contemplated modes of carrying out the invention. The description is not to be taken in a limiting sense but is made merely for the purpose of illustrating the general principles of the invention.

Overview

Embodiments of the invention are directed to a universal multifunctional skateboard and surfboard tool. The universal multifunctional skateboard and surfboard tool as herein described may be primarily structured and sized for use on skateboards and surfboards, such as for adjusting the wheel mount nuts and wheel-trucks and associated fasteners of skateboards and adjusting the fins, decks, and leash of a surfboard. Although the present invention is described for use with skateboards and surfboards, this is by way of example only and the present tool can also be used on other equipment including, but not limited to, in-line skates, bicycles, and snowboards.

The universal multifunctional tool is small, lightweight, and compact enough for an individual to carry the tool while skateboarding or surfing so the tool is readily available to make repairs and adjustments to the equipment. That is, the portability of the tool allows for on-the-fly repair of equipment without having to return to a different location for retrieving the tool. Furthermore, the structure or configuration of the tool provides portability allowing the tool to be carried in a pocket so that the user is unlikely to become injured by the tool should he or she fall. For example, the tool may be carried in the watch pocket of a pair of jeans or other pocket of a piece of clothing such as the pocket of a shirt, coat, or jacket.

The present universal multifunctional tool, when partly disassembled or reconfigured from its stored state, allows for convenient pipe smoking whenever one wishes.

Skateboard and Surfboard Tool

Figure 1:
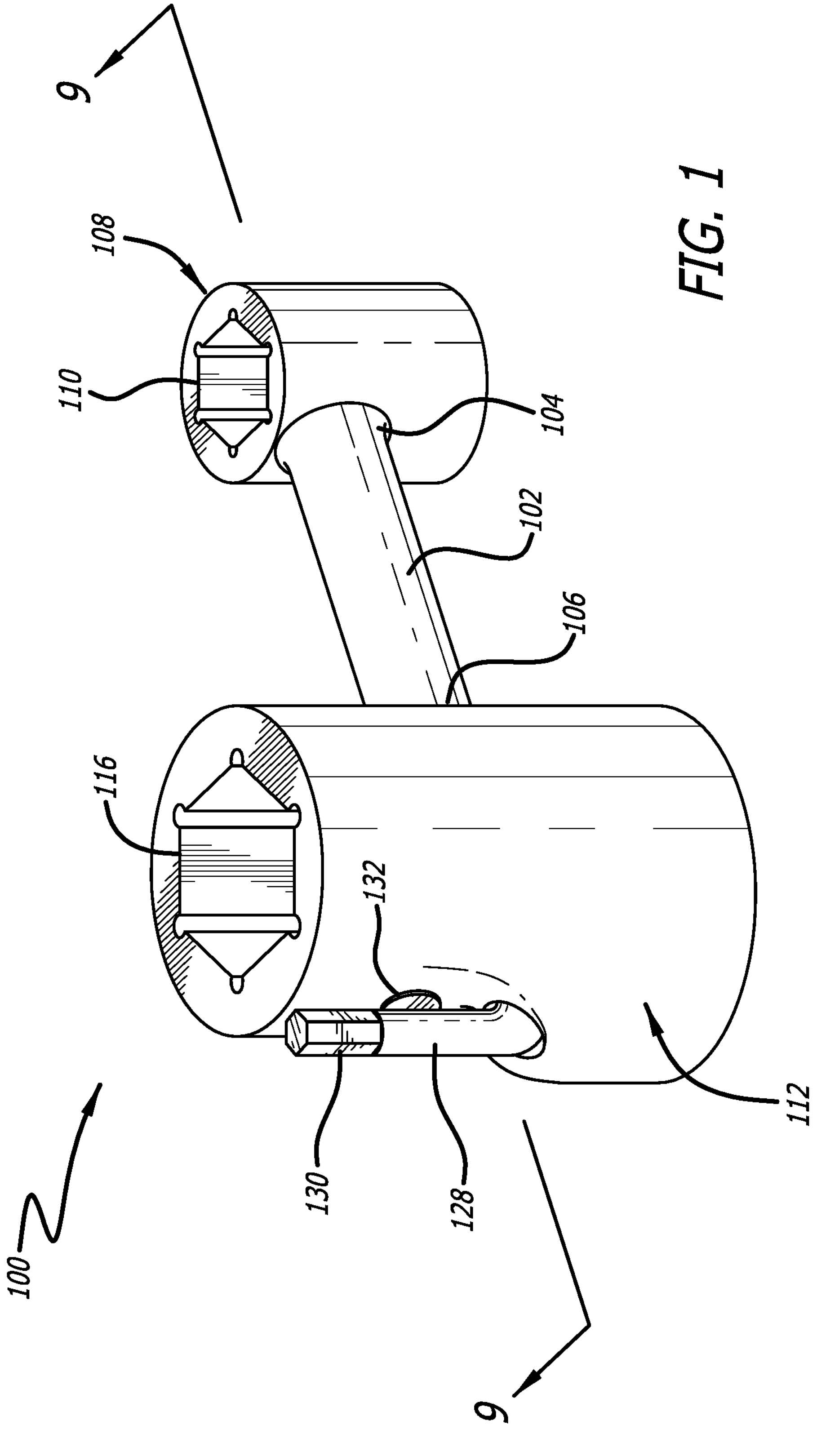
FIG. 1 is a perspective view of a skateboard and surfboard tool, according to one embodiment of the present invention.
Figure 2:
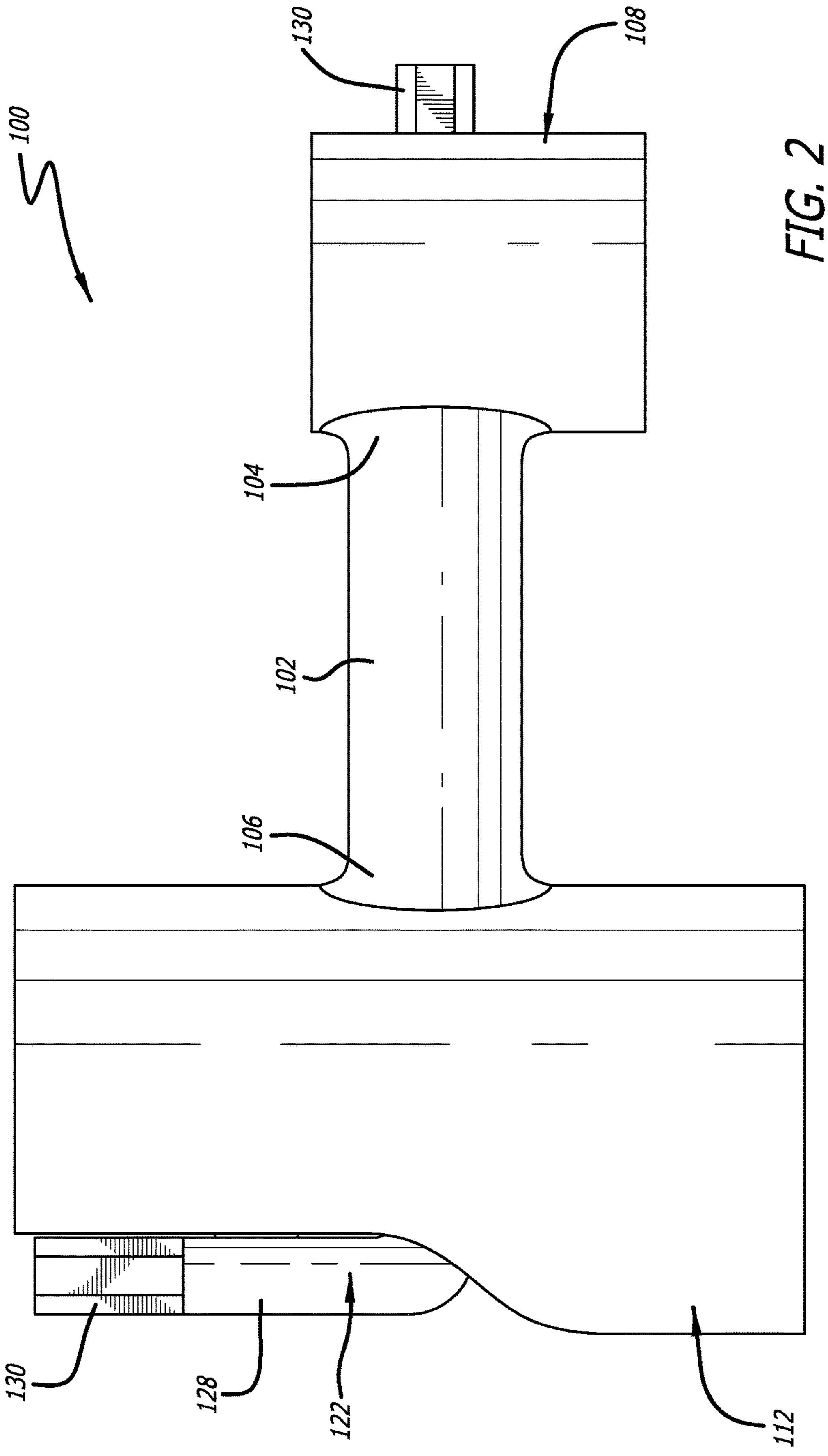
FIG. 2 is a right-side elevation view of the skateboard and surfboard tool of FIG. 1.
Figure 3:
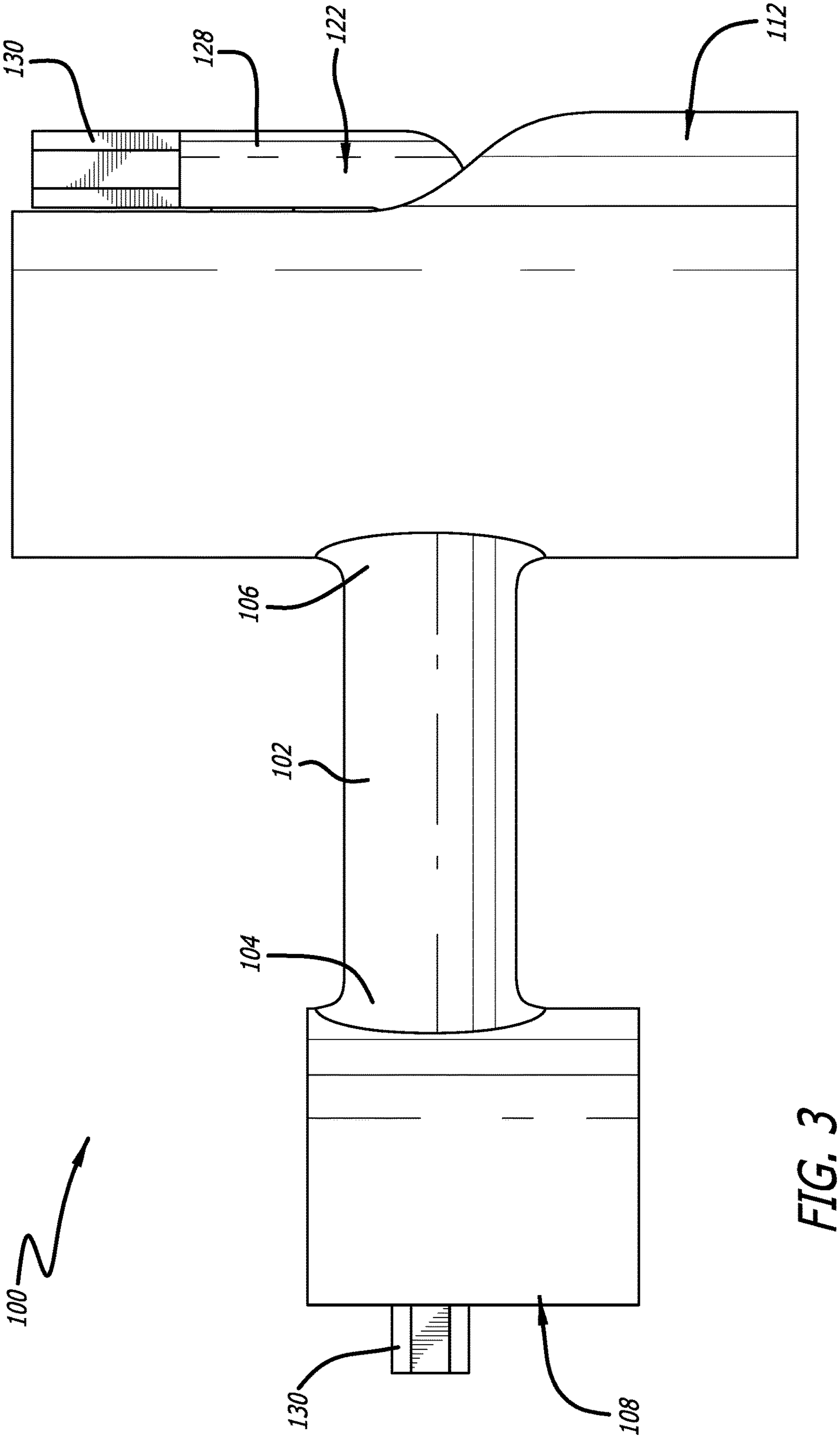
FIG. 3 is a left-side elevation view of the skateboard and surfboard tool of FIG. 1.
Figure 5:
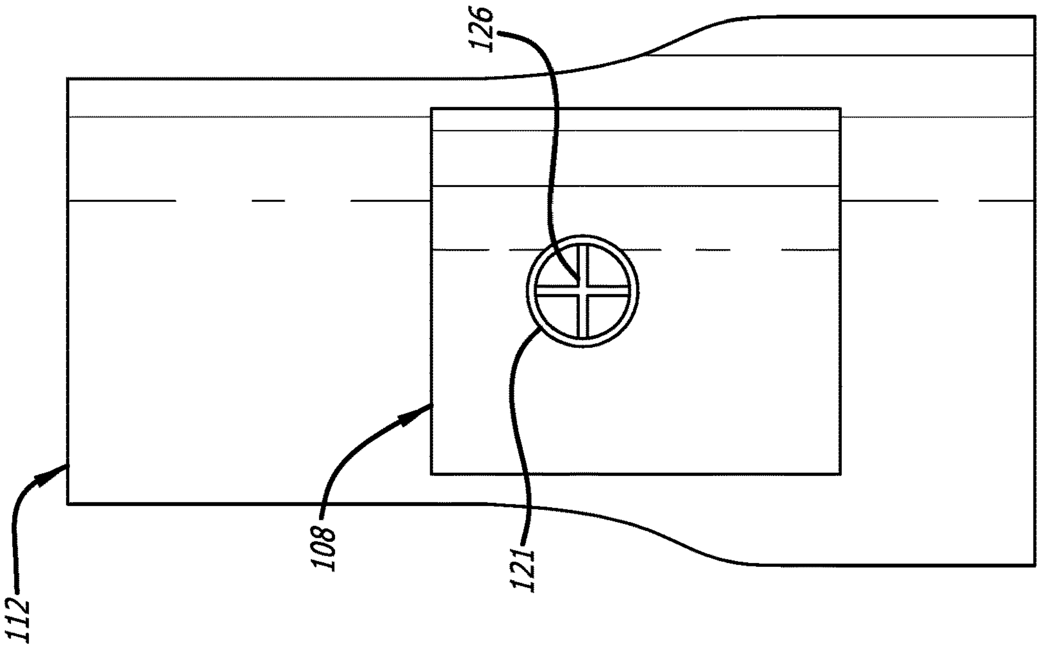
FIG. 5 is a rear end view of the skateboard and surfboard tool of FIG. 1.
Figure 4:
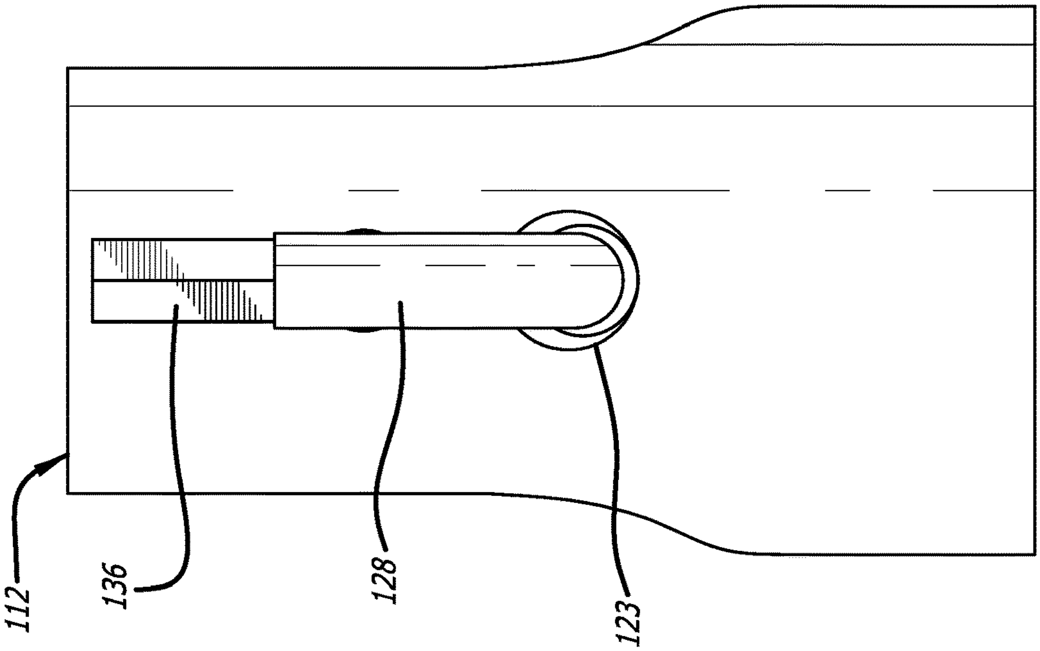
FIG. 4 is a front-end view of the skateboard and surfboard tool of FIG. 1.
Figure 6:
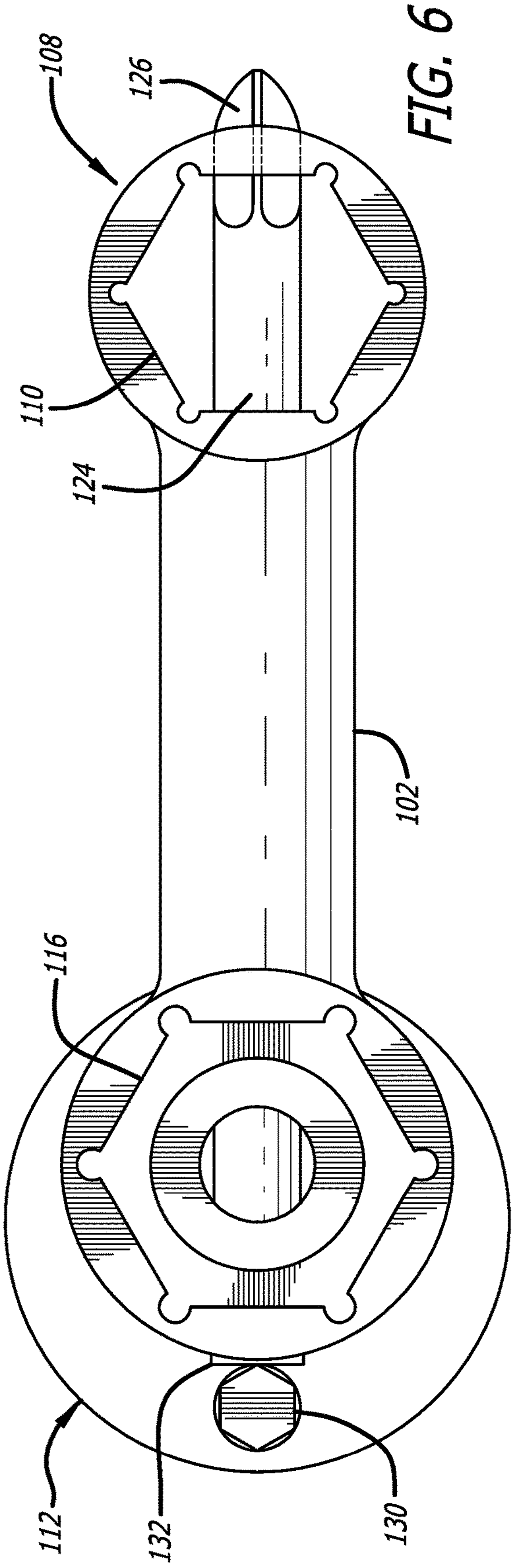
FIG. 6 is a top plan view of the skateboard and surfboard tool of FIG. 1.
Figure 7:
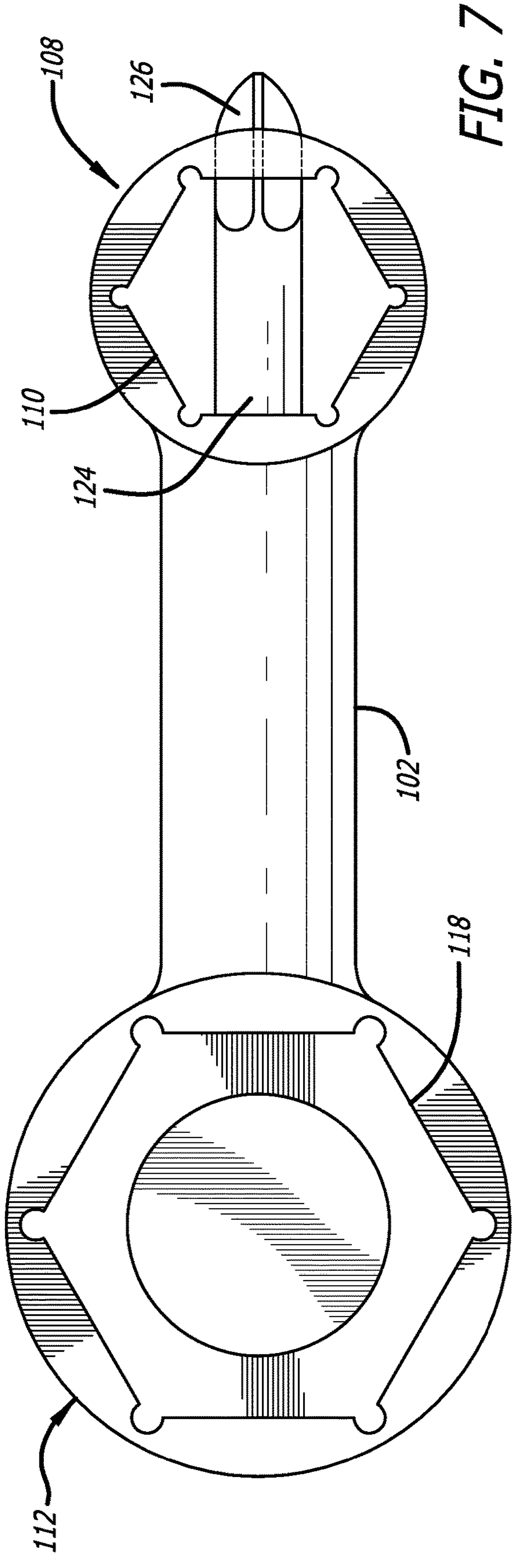
FIG. 7 is a bottom plan view of the skateboard and surfboard tool of FIG. 1.
Figure 8:
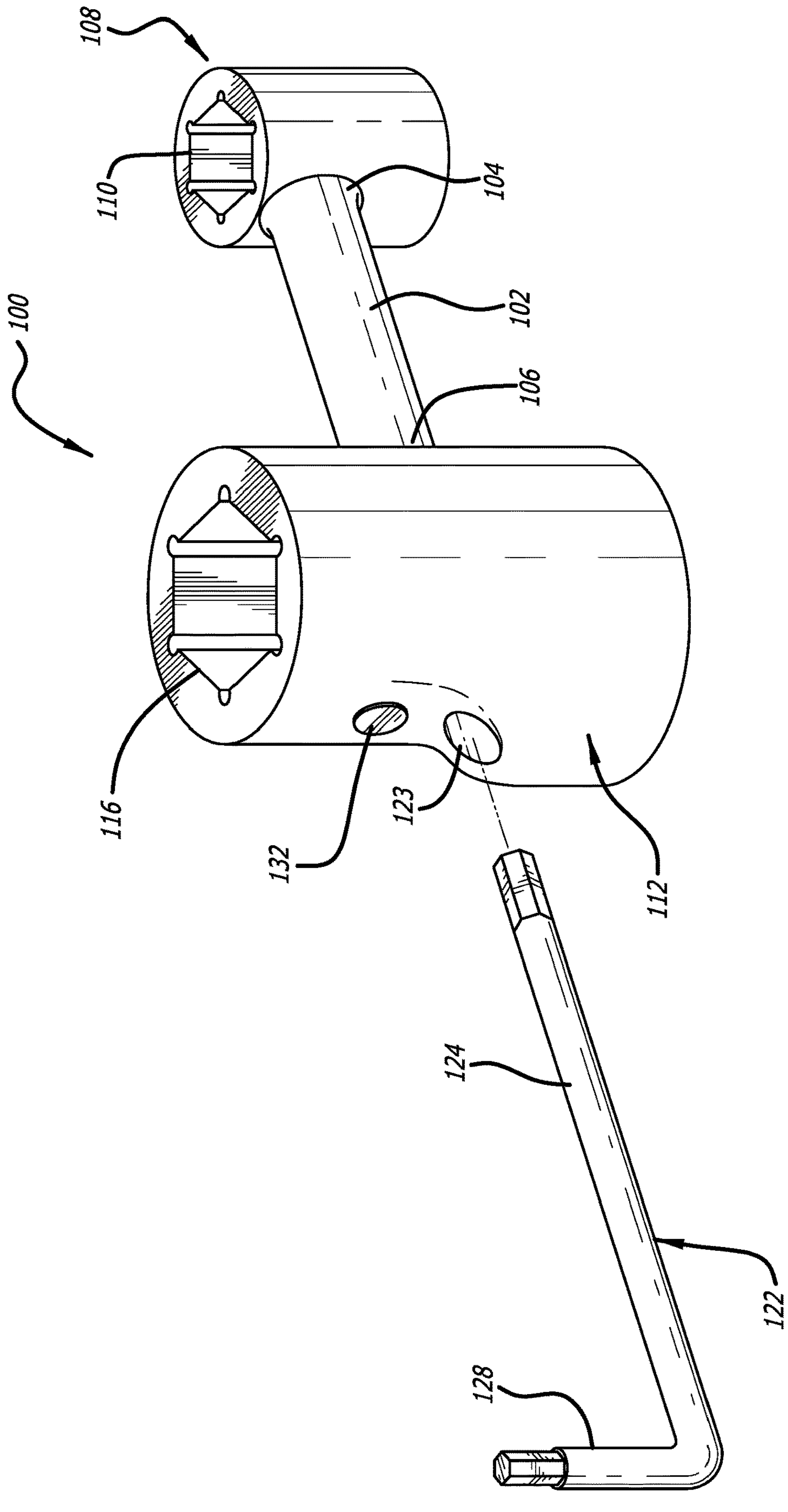
FIG. 8 is a perspective view of the skateboard and surfboard tool of FIG. 1 showing an adjustment member separated from a housing.
Figure 9:
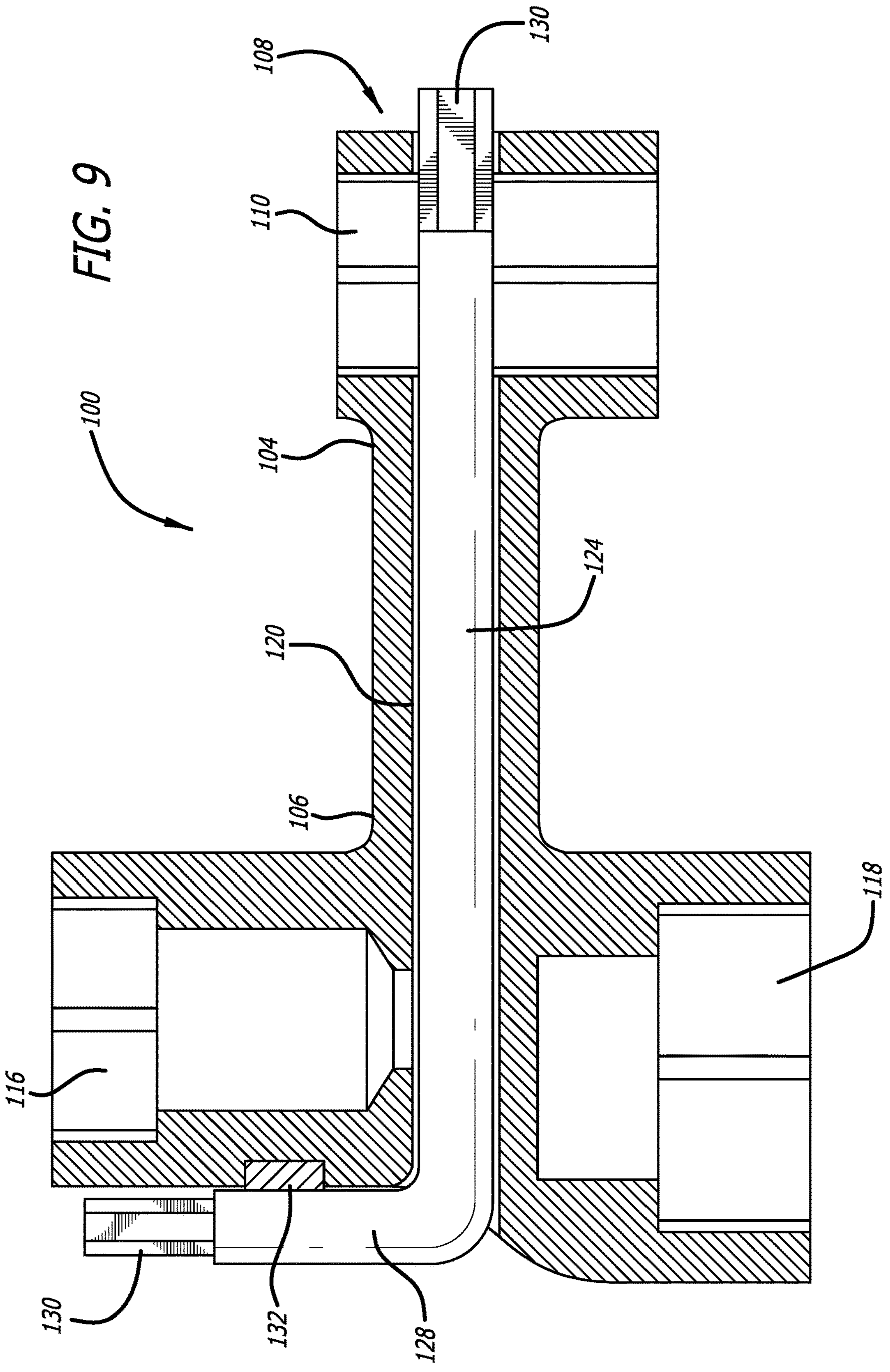
FIG. 9 is a cross-sectional view taken along line 9-9 in FIG. 1.
Figure 10:
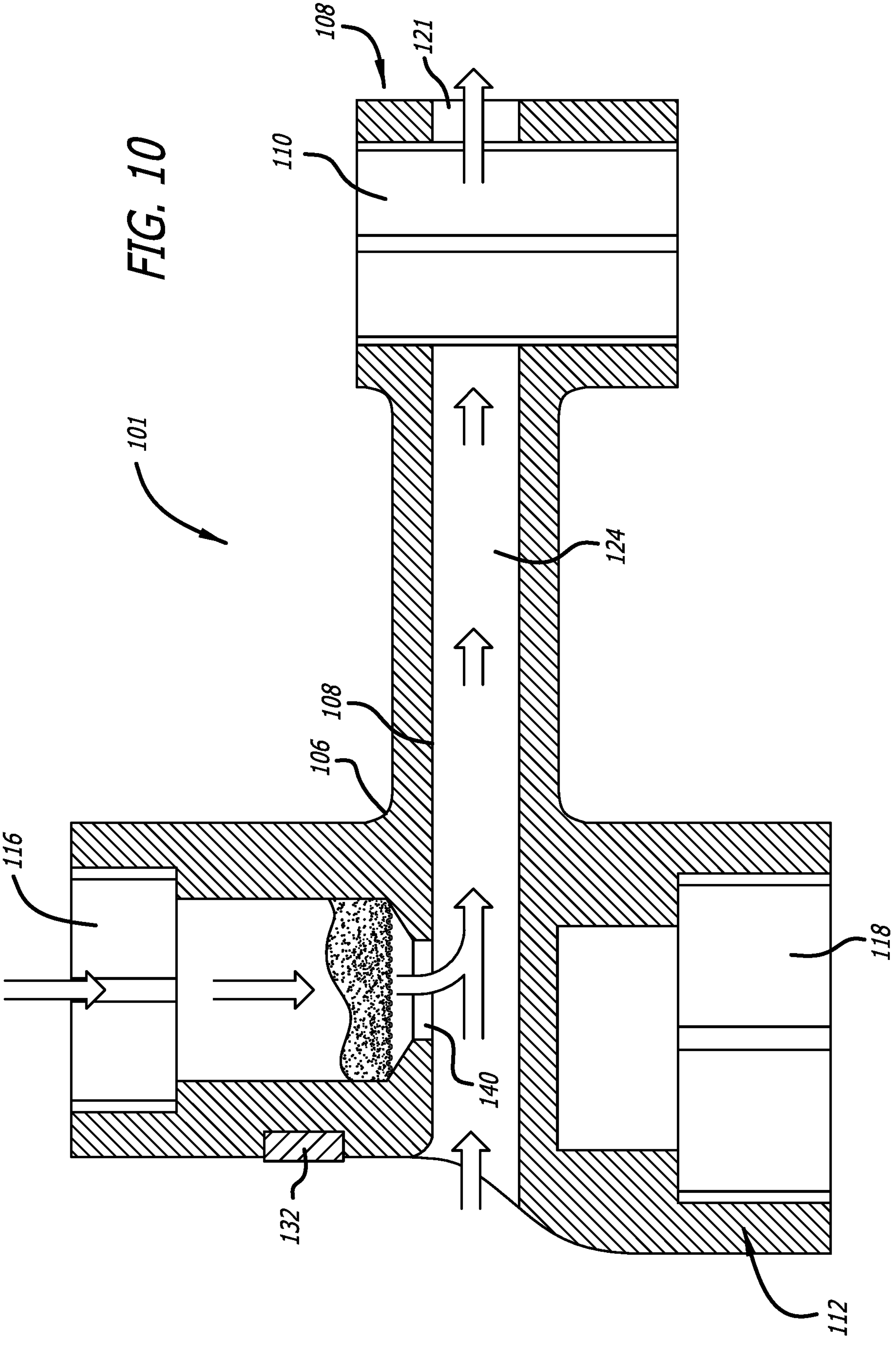
FIG. 10 is a cross-sectional view of the skateboard and surfboard tool showing the flow of air when in use as a pipe for smoking tobacco products.
Figure 11:
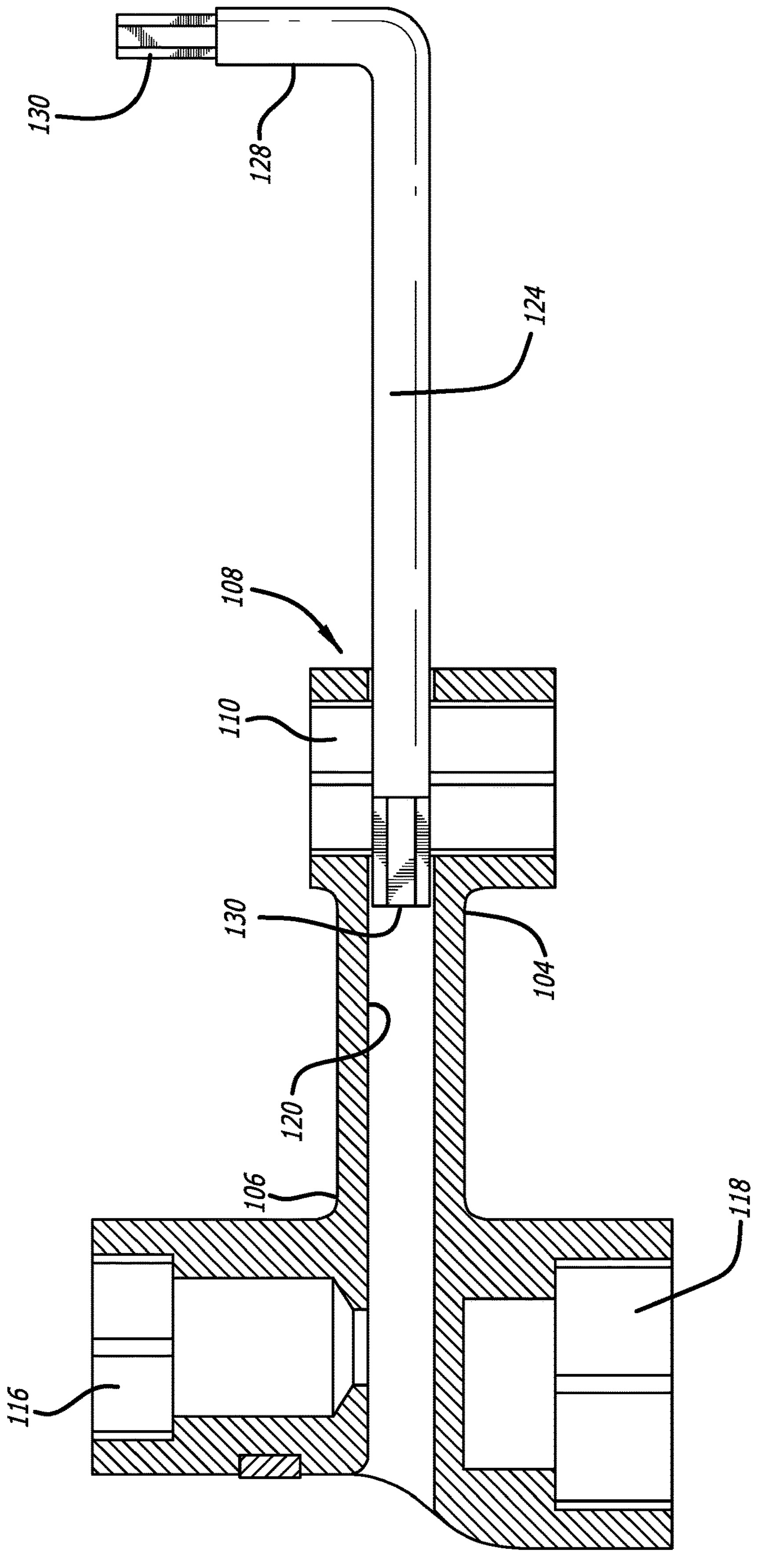
FIG. 11 is a cross-sectional view of the skateboard and surfboard tool showing the adjustment member extending outward from the distal end of the housing.
Figure 12:
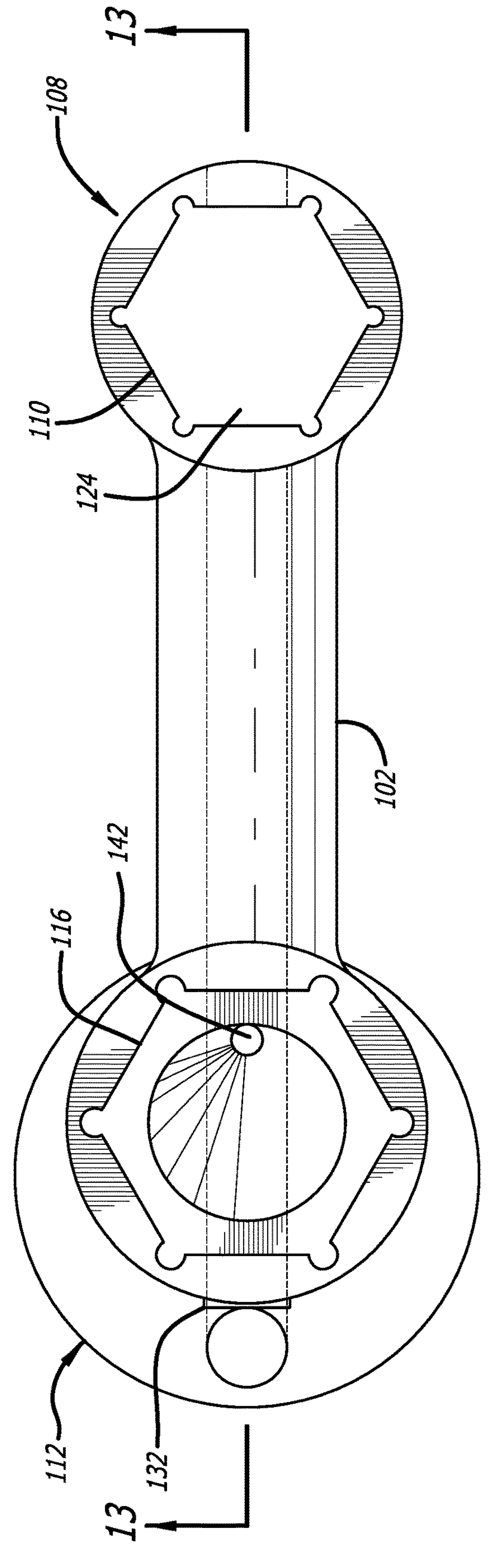
FIG. 12 is a top plan view of skateboard and surfboard tool according to another embodiment of the present invention.
Figure 13:
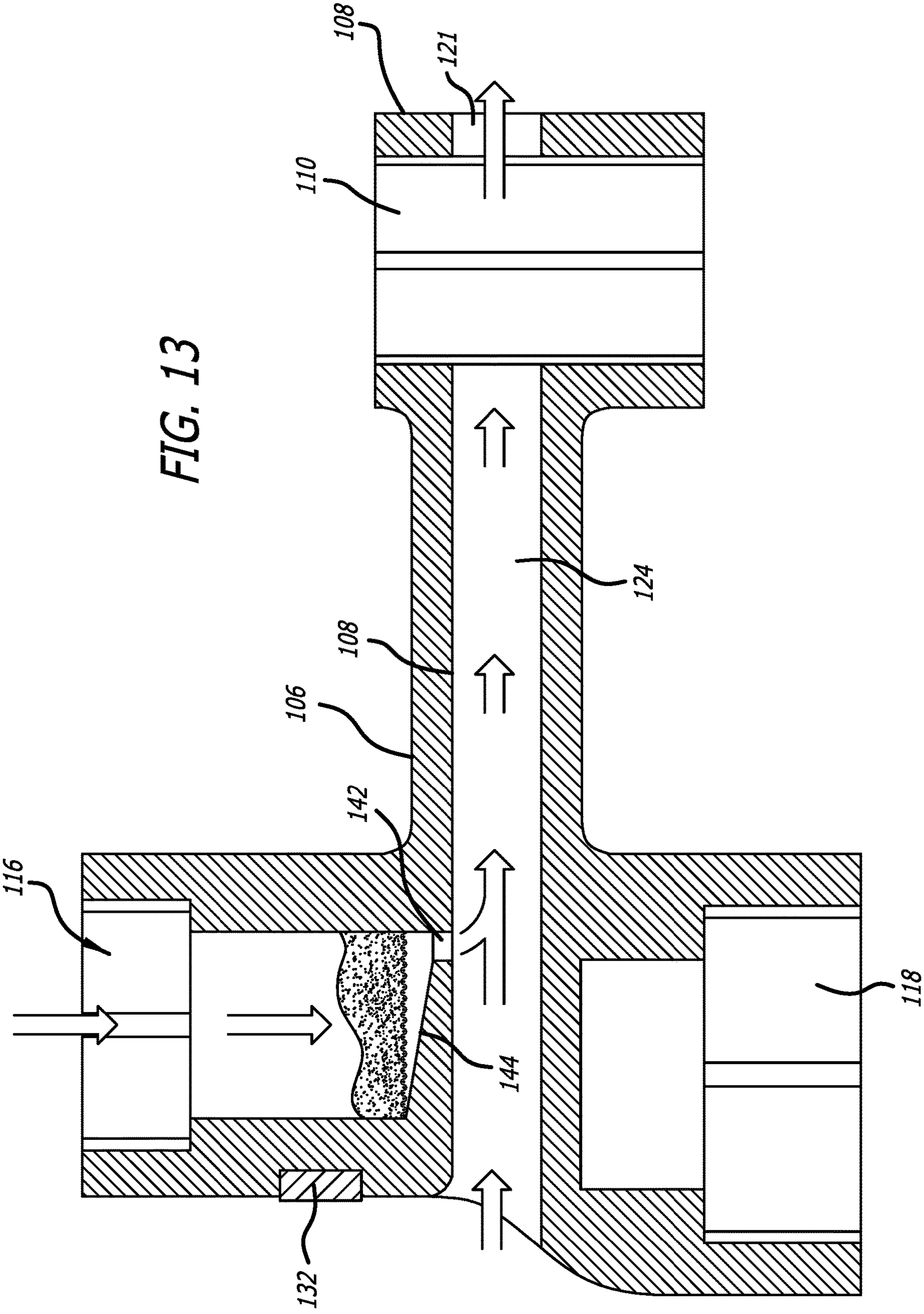
FIG. 13 is a cross-sectional view taken along line 13-13 in FIG. 12.

FIG. 1 is a perspective view of a skateboard and surfboard tool of the present invention. FIG. 2 is a right-side elevation view of the skateboard and surfboard tool of FIG. 1. FIG. 3 is a left-side elevation view of the skateboard and surfboard tool of FIG. 1. FIG. 4 is a front-end view of the skateboard and surfboard tool of FIG. 1. FIG. 5 is a rear end view of the skateboard and surfboard tool of FIG. 1. FIG. 6 is a top plan view of the skateboard and surfboard tool of FIG. 1. FIG. 7 is a bottom plan view of the skateboard and surfboard tool of FIG. 1. FIG. 8 is a perspective view of the skateboard and surfboard tool of FIG. 1 showing an adjustment member separated from a housing. FIG. 9 is a cross-sectional view taken along line 9-9 in FIG. 1. FIG. 10 is a cross-sectional view of the skateboard and surfboard tool showing the flow of air when in use as a pipe for smoking tobacco products. FIG. 11 is a cross-sectional view of the skateboard and surfboard tool showing the adjustment member extending outward. FIG. 12 is a top plan view of skateboard and surfboard tool according to another embodiment of the present invention. FIG. 13 is a cross-sectional view taken along line 13-13 in FIG. 12. The following discussion refers interchangeably to FIGS. 1-13.

As shown, the universal multifunctional skateboard and surfboard tool 100 includes a housing 101 adapted to receive an adjustment member 122. The housing 101 comprises an elongated cylindrical member 102 integrally connected between a first socket head 108, at a distal end of the tool 100, and a second socket head 112 at a proximal end of the tool 100. The elongated cylindrical member 102 is defined by an annular sidewall having a first elongated cylindrical member end 104 integrally connected to the first socket head 108 and an opposing second elongated cylindrical member end 106 integrally connected to the second socket head 112.

The first socket head 108 includes an annular sidewall defining a first hexagonal socket 110. The second socket head 112 includes an annular sidewall defining a second hexagonal socket 116 at a first vertical end and a third hexagonal socket 118 at a second vertical end, where the second and third second hexagonal sockets 116, 118 are located within the same vertical plane. The third hexagonal socket is located in the same vertical plane as the second hexagonal socket where the second horizontal socket is located at a first vertical end of the vertical plane and the third horizontal socket is located at an opposing second vertical end of the vertical plane.

According to one aspect, the diameter of the first hexagonal socket 110 is smaller than the diameter of the second hexagonal socket 116 while the diameter of the second hexagonal socket 116 is smaller than the diameter of the third hexagonal socket 118. Each of the annular sidewalls of the first, second and third hexagonal sockets 110, 116, 118 extend at a right angle to the lengthwise axis of the elongated cylindrical member 102 and are for use in manipulating nuts and bolt heads. The hexagonal sockets may be any size, including but not limited to, a $\frac{3}{8}^{th}$, $\frac{1}{2}$, $\frac{9}{16}^{th}$, and $\frac{3}{32}$.

While the socket heads illustrated in the figures have generally cylindrical outer contours and have smooth outer surfaces, the socket heads may have any suitable outer shape, including, but not limited to, square, hexagonal, octagonal, and rectangular.

In one embodiment, the housing 101 of the multifunctional skateboard and surfboard tool 100 may include a cavity 120 extending horizontally through the first socket head 108, the elongated cylindrical member 102, and the second socket head 112. The cavity 120 extends from a first hole 121 located in an outer surface of the annular side wall of the first socket head 108 and terminates at a second hole 123 located in an outer surface of the annular sidewall of the third hexagonal socket 118 of the second socket head 112. According to one aspect, the first and second holes 121, 123 may be located in the same horizontal plane allowing for the adjustment member 122 to be received within the cavity 120.

When the adjustment member 122 is fully received within the cavity 120 of the housing 101, the universal multifunctional skateboard and surfboard tool 100 is in an assembled configuration. When in the assembled configuration, the universal multifunctional skateboard and surfboard tool 100 is light-weight, compact, and portable allowing for the universal multifunctional skateboard and surfboard tool 100 to be safely stored in a pocket of clothing, for example, so that the person is unlikely to become injured by the universal multifunctional skateboard and surfboard tool 100 should he or she fall during an event. As described in more detail below, when the universal multifunctional skateboard and surfboard tool 100 is in a disassembled configuration from its stored state, the housing 101 allows for convenient pipe smoking whenever one wishes.

In one embodiment, the adjustment member 122 may be a combination of an Allen® key on one end and a Phillips® head on the other end. As shown, the adjustment member 122 may comprise a first arm 124, terminating in a Phillips® head 126, integrally connected to a second arm 128, terminating in an Allen® key 130, where the first arm 124 is perpendicular to the second arm 128. (See FIGS. 5-7) Alternatively, the first arm 124 may terminate in an Allen® key and the second arm 128 may terminate in a Phillips® head. In another embodiment, both the first arm 124 and the second arm 128 may terminate in Philips heads or both may terminate in Allen® keys (see FIG. 8). The first arm may be longer 124 than the second arm 124.

According to one aspect, the adjustment member 122 may utilize standard Phillips® and/or Allen® key heads allowing for the user to easily replace the adjustment member 122 if lost or damaged with an Off the shelf adjustment member 122 that may be found at any local hardware store. The Allen® key heads may be any size Allen® key head, including but not limited to, $1/8^{th}$ and $3/32^{nd}$.

One or more magnets may be utilized to detachably secure the adjustment member 122 within the housing of the universal multifunctional skateboard and surfboard tool 100. As shown in FIGS. 1, 6, and 8, a magnet 132 may be located on the outer surface of the annular sidewall of the second socket head 112 above the second hole 123, where the second hole 123 is adapted to receive the adjustment member 122. When the universal multifunctional skateboard and surfboard tool 100 is in the fully assembled configuration, the adjustment member 122 is fully received within the cavity 120 of the housing 101 such that the second arm 128 of the adjustment member 122 is detachably connected to the magnet 132, and the first arm 124 extends through the cavity 120 and protrudes through the first hole 121 in the first socket head 108 beyond the distal end of housing 101.

To release the adjustment member 122 from the housing 101, the user presses or pushes the protruding portion of the adjustment member 122 inward along the axial direction of the cavity 120 causing the adjustment member 122 to be released from the magnet 132 allowing the adjustment member 122 to be removed from the cavity 120 of the housing 101.

As mentioned previously, when in a disassembled configuration and the adjustment member is removed from the housing 101, the housing 101 may be used as a pipe to smoke tobacco. FIG. 10 is a cross-sectional view of the skateboard and surfboard tool showing the flow of air when in use as a pipe for smoking tobacco products. As shown in FIG. 10, the first socket head 108 serves as a mouthpiece end or mouth end to be engaged by the smoker's lips when housing 101 is used to smoke tobacco. Tobacco may be placed in the bowl of the second hexagonal socket 116 and when lit, the smoke and air from the burning tobacco may be drawn into the cavity 120 by the smoker when the housing 101. Air may be drawn into the cavity from a socket hole 140 in the base of the second hexagonal socket 116 and the second hole 123.

When in the disassembled configuration, a user may insert the end of the first arm of the adjustment member into the first hole 121 in the first socket head 108. FIG. 11 is a cross-sectional view of the skateboard and surfboard tool showing the adjustment member extending outward from the distal end of the housing 101. As shown, the end of the first arm of the adjustment member 122 is inserted into the cavity 120 via the first hole 121 until the end of the adjustment member extends through the first hexagonal socket 110 and is engaged on the opposite side. By configuring the tool as shown in FIG. 11, the housing 101 may be used as an extension to the adjustment member 122 providing the user with additional leverage when making adjustments. Furthermore, the extension allows for the tool to rotate on the end of the axis without touching or interfering with the deck of the skateboard.

FIG. 12 is a top plan view of the universal multifunctional skateboard and surfboard tool according to another embodiment of the present invention. FIG. 13 is a cross-sectional view taken along line 13-13 in FIG. 12. As described above with reference to FIG. 10, the first socket head 108 serves as a mouthpiece end or mouth end to be engaged by the smoker's lips when housing 101 is used to smoke tobacco. Tobacco may be placed in the bowl of the second hexagonal socket 116 and when lit, the smoke and air from the burning tobacco may be drawn into the cavity by the smoker when the housing 101 is being used as a pipe to smoke tobacco. The base 144 of the second hexagonal socket 116 may be sloped or tapered to one side creating a funnel inside the second hexagonal socket 116 so that air may be drawn into the cavity from an offset socket hole 142 in the base 116 of the second hexagonal socket 116 and the second hole 123. That is, the offset socket hole 142 is offset from the center of the base of the second hexagonal socket 116. By offsetting the offset socket hole 142 in the base 116 of the second hexagonal socket 116, a smoker may utilize a finger over the first hole 121 acting as a carburetor regulating the flow of air through the cavity 120 and directing the heat away from the fingers of the smoker.

CONCLUSION

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "at least one" and "one or more" may be used interchangeably herein.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of:” a list of items refers to any combination of those items, including single members. As an example, “at least one of: a, b, or c” is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A universal multifunctional skateboard and surfboard tool, comprising:

a housing, comprising:

an elongated cylindrical member having a first elongated cylindrical member end and an opposing second elongated cylindrical member end;

a first socket head integrally connected to and extending perpendicularly outward from the first elongated cylindrical member end, the first socket head defining a first hexagonal socket;

a second socket head integrally connected to and extending perpendicularly outward from the second elongated cylindrical member end, the second socket head defining a second first hexagonal socket; and a cavity extending horizontally extending horizontally through the first socket head, the elongated cylindrical member, and the second socket head;

wherein the second socket head includes an annular sidewall having an outer surface and an inner surface;

wherein the second socket head further includes a first vertical end and an opposing second vertical end, defining a first hexagonal socket at the first vertical end and a second hexagonal socket at the second vertical end; and wherein the first and second hexagonal sockets are located within a same vertical plane;

an adjustment member configured to be received within the cavity at the first socket head, the adjustment member comprising:

a first arm; and a second arm, the second arm integrally connected, and perpendicular to, the first arm; and wherein the second arm of the adjustment member is in contact with the outer surface of the annular sidewall when fully received in the cavity.

2. The tool of claim 1, wherein the first arm terminates in a Phillips® head.

3. The tool of claim 1, wherein the second arm terminates in a hex key.

4. The tool of claim 1, wherein the housing further comprises a magnet on an outer surface of the second socket head.

5. The tool of claim 1, wherein the housing further comprises a socket hole located in a base of the second hexagonal socket for allowing air to enter the cavity.

6. The tool of claim 5, wherein the socket hole is offset from a center of the base of the second hexagonal socket.

7. The tool of claim 6, wherein the base of the second hexagonal socket is tapered creating a funnel inside the second hexagonal socket.

8. The tool of claim 1, wherein the diameter of the first hexagonal socket is smaller than a diameter of the second hexagonal socket.

9. The tool of claim 8, wherein the housing further comprises a third hexagonal socket, the third hexagonal socket is located in a same vertical plane as the second hexagonal socket where the second horizontal socket is located at a first vertical end of the vertical plane and the third horizontal socket is located at an opposing second vertical end of the vertical plane; wherein the cavity extends from a first hole located in an outer surface of the annular side wall of the first socket head and terminates at a second hole located in an outer surface of an annular sidewall of the third hexagonal socket of the second socket head; and wherein the second arm of the adjustment member extends through the cavity and protrudes through the first hole in the first socket head beyond the distal end of housing.

10. The tool of claim 9, wherein the diameter of the first second hexagonal socket is smaller than a diameter of the third hexagonal socket.

11. A universal multifunctional skateboard and surfboard tool, comprising:

a housing, comprising:

an elongated cylindrical member having a first elongated cylindrical member end and an opposing second elongated cylindrical member end;

a first socket head integrally connected to and extending perpendicularly outward from the first elongated cylindrical member end, the first socket head defining a first hexagonal socket;

a second socket head integrally connected to and extending perpendicularly outward from the second elongated cylindrical member end, the second socket head defining a second first hexagonal socket;

a cavity extending horizontally through the first socket head, the elongated cylindrical member, and the second socket head;

a socket hole located in a base of the second hexagonal socket for allowing air to enter the cavity; and a magnet on an outer surface of the second socket head; and wherein the second socket head includes an annular sidewall having an outer surface and an inner surface;

wherein the second socket head further includes a first vertical end and an opposing second vertical end, defining a first hexagonal socket at the first vertical end and a second hexagonal socket at the second vertical end; and wherein the first and second hexagonal sockets are located within a same vertical plane;

an adjustment member configured to be received within the cavity at the first socket head, the adjustment member comprising:

a first arm; and a second arm, the second arm integrally connected, and perpendicular to, the first arm; and wherein the second arm of the adjustment member is in contact with the outer surface of the annular sidewall when fully received in the cavity.

12. The tool of claim 11, wherein the first arm terminates in a Phillips® head.

13. The tool of claim 11, wherein the second arm terminates in a hex key.

14. The tool of claim 11, wherein the socket hole is offset from a center of the base of the second hexagonal socket.

15. The tool of claim 14, wherein the base of the second hexagonal socket is tapered creating a funnel inside the second hexagonal socket.

16. The tool of claim 11, wherein the diameter of the first hexagonal socket is smaller than a diameter of the second hexagonal socket.

17. The tool of claim 11, wherein the housing further comprises a third hexagonal socket, the third hexagonal socket is located in the socket hole and a same vertical plane as the second hexagonal socket where the second horizontal socket is located at a first vertical end of the vertical plane and a third horizontal socket is located at an opposing second vertical end of the vertical plane, and wherein the cavity extends from a first hole located in an outer surface of an annular side wall of the first socket head and terminates at a second hole located in an outer surface of an annular sidewall of the third hexagonal socket of the second socket head.

18. The tool of claim 11, wherein the diameter of the first hexagonal socket is smaller than a diameter of the third hexagonal socket.

19. A universal multifunctional skateboard and surfboard tool, consisting of:

a housing, consisting of:

an elongated cylindrical member having a first elongated cylindrical member end and an opposing second elongated cylindrical member end;

a first socket head integrally connected to and extending perpendicularly outward from the first elongated cylindrical member end, the first socket head defining a first hexagonal socket;

a second socket head integrally connected to and extending perpendicularly outward from the second elongated cylindrical member end, the second socket head defining a second first hexagonal socket;

a cavity extending horizontally through the first socket head, the elongated cylindrical member, and the second socket head;

a socket hole located in a base of the second hexagonal socket for allowing air to enter the cavity;

a magnet located on an outer surface of the second socket head; and a third hexagonal socket, the third hexagonal socket is located in the socket hole and a same vertical plane as the second hexagonal socket where the second horizontal socket is located at a first vertical end of the vertical plane and a third horizontal socket is located at an opposing second vertical end of the vertical plane, and wherein the cavity extends from a first hole located in an outer surface of an annular side wall of the first socket head and terminates at a second hole located in an outer surface of an annular sidewall of the third hexagonal socket of the second socket head; and wherein the second socket head includes an annular sidewall having an outer surface and an inner surface;

wherein the second socket head further includes a first vertical end and an opposing second vertical end, defining a first hexagonal socket at the first vertical end and a second hexagonal socket at the second vertical end; and wherein the first and second hexagonal sockets are located within a same vertical plane;

an adjustment member configured to be received within the cavity at the first socket head, the adjustment member consisting of:

a first arm terminating in a Phillips® head; and a second arm terminating in a hex key, the second arm integrally connected, and perpendicular to, the first arm; and wherein the second arm of the adjustment member is in contact with the outer surface of the annular sidewall when fully received in the cavity.

* * * * *